(12) United States Patent
Chen

(10) Patent No.: US 10,530,264 B1
(45) Date of Patent: Jan. 7, 2020

(54) POWER SUPPLY CIRCUIT AND PROTOCOL CONTROL CIRCUIT THEREOF

(71) Applicant: RICHTEK TECHNOLOGY CORPORATION, Zhubei, HsinChu (TW)

(72) Inventor: Yu-Kai Chen, Tainan (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/419,041

(22) Filed: May 22, 2019

Related U.S. Application Data

(60) Provisional application No. 62/691,433, filed on Jun. 28, 2018.

(30) Foreign Application Priority Data

Mar. 20, 2019 (CN) .......................... 2019 1 0211640

(51) Int. Cl.
*H02M 3/335* (2006.01)
*H02M 1/08* (2006.01)
*G06F 1/28* (2006.01)
*G06F 13/42* (2006.01)
*H02M 1/00* (2006.01)

(52) U.S. Cl.
CPC .......... *H02M 3/33576* (2013.01); *G06F 1/28* (2013.01); *G06F 13/4282* (2013.01); *H02M 1/08* (2013.01); *G06F 2213/0042* (2013.01); *H02M 2001/0009* (2013.01)

(58) Field of Classification Search
CPC ............... H02M 3/33576; H02M 1/08; H02M 2001/0009; G06F 1/28; G06F 13/4282; G06F 2213/0042
See application file for complete search history.

(56) References Cited

U.S. PATENT DOCUMENTS 9,912,224 B2 * 3/2018 Shiu ........................ H02M 1/32
10,396,674 B2 * 8/2019 Lin .................... H02M 3/33507
2015/0326117 A1 * 11/2015 Tischler ............. H05B 33/0815
315/185 R

* cited by examiner

*Primary Examiner* — Kyle J Moody
(74) *Attorney, Agent, or Firm* — Tung & Associates

(57) ABSTRACT

A power supply circuit includes a power converter circuit, a path switch and a protocol control circuit. The protocol control circuit controls the power converter circuit and the path switch. The protocol control circuit includes: a shared pin and a signal determination circuit. The shared pin is coupled to the bus node via the temperature sensitive device and transmits different signals having different functions under at least two different modes. The signal determination circuit senses a voltage at the bus node via the shared pin under a power start-up mode, to determine whether to control the path switch to conduct the power path, thereby determining whether to enter a power supply mode. The signal determination circuit receives a temperature signal generated by the temperature sensitive device via the shared pin under the power supply mode, to determine an ambient temperature where the temperature sensitive is located.

25 Claims, 9 Drawing Sheets

US 10,530,264 B1

POWER SUPPLY CIRCUIT AND PROTOCOL CONTROL CIRCUIT THEREOF

CROSS REFERENCE

The present invention claims priority to U.S. 62/691,433, filed on Jun. 28, 2018 and claims priority to CN 201910211640.X, filed on Mar. 20, 2019.

BACKGROUND OF THE INVENTION

Field of Invention

The present invention relates to a power supply circuit. In particular, the present invention relates to such power supply circuit having a protocol control function. The present invention also relates to a protocol control circuit in a power supply circuit.

Description of Related Art

Please refer to FIG. 1, which shows a schematic diagram of a conventional power supply circuit (i.e., power supply circuit 1). In the power supply circuit 1, protocol control circuit 350 is configured to operably control a power converter circuit 110 and a path switch QP. The power converter circuit 110 is configured to operably convert an input power VIN to generate an output power at an output node NOUT. The path switch QP is coupled between the output node NOUT and a bus node NB, for controlling a power path between the output node NOUT and the bus node NB. In this prior art, the protocol control circuit 350 is an integrated circuit (IC) including ten pins, namely: a feedback control pin 351, a current sensing pin 352, a ground pin 353, a power pin 354, a reserved pin 355, a temperature sensing pin 356, a bus sensing pin 357, a switch control pin 358, a first configuration channel pin 359 and a second configuration channel pin 360. The protocol control circuit 350 receives and transmits configuration of the output power of the power converter circuit 110 through the first configuration channel pin 359 and the second configuration channel pin 360, and generates the output power at the output node NOUT according to configuration of the output power. The protocol control circuit 350 senses a voltage at the bus node NB via the bus sensing pin 357 under a power start-up mode, to determine whether to control the path switch QP to conduct the power path, thereby determining whether or not to enter a power supply mode. Besides, the protocol control circuit 350 receives a temperature signal generated by a thermistor RT via the temperature sensing pin 356 under the power supply mode, to determine an ambient temperature where the thermistor RT is located.

The prior art shown in FIG. 1 has a drawback in that: because various pins having different dedicated functions are employed, the protocol control circuit 350 has a relatively larger number of pins, resulting in higher cost and larger circuit size.

As compared to the prior art shown in FIG. 1, the present invention has an advantage that, through one pin, the present invention can transmit different signals having different functions under at least two different modes. Consequently and desirably, the pin number and the circuit size of the protocol control circuit 350 can be reduced, which reduces the manufacturing cost.

SUMMARY OF THE INVENTION

From one perspective, the present invention provides a power supply circuit, comprising: a power converter circuit, which is configured to operably convert an input power to generate an output power at an output node; a path switch coupled between the output node and a bus node, the path switch being configured to operably control a power path between the output node and the bus node; a temperature sensitive device, which is coupled to the bus node; and a protocol control circuit, which is configured to operably control the power converter circuit and the path switch, wherein the protocol control circuit includes: a shared pin coupled to the bus node via the temperature sensitive device, the shared pin being configured to operably transmit different signals having different functions under at least two different modes; and a signal determination circuit, which is configured to operably sense a voltage at the bus node via the shared pin under a power start-up mode, to determine whether to control the path switch to conduct the power path, thereby determining whether or not to enter a power supply mode, wherein the path switch is OFF under the power start-up mode; and wherein the signal determination circuit is configured to operably receive a temperature signal generated by the temperature sensitive device via the shared pin under the power supply mode, to determine an ambient temperature.

In one embodiment, the protocol control circuit further includes a discharging circuit coupled to the bus node via the shared pin and the temperature sensitive device, wherein the discharging circuit includes a discharging current source and/or a discharging switch; wherein when the path switch is turned OFF, the discharging current source and/or the discharging switch, via the shared pin, discharges the voltage at the bus node to a predetermined reference voltage level.

In one embodiment, the protocol control circuit further includes a power pin coupled to the output node, to receive the output power and to supply power to the protocol control circuit; wherein under the power supply mode, the signal determination circuit obtains the temperature signal according to a voltage difference between a voltage of the power pin and a voltage of the shared pin.

In one embodiment, the signal determination circuit includes a first current source or a first resistor, wherein the first current source or the first resistor is coupled to the temperature sensitive device via the shared pin and is configured to operably bias the temperature sensitive device to generate the temperature signal.

In one embodiment, the signal determination circuit includes a first comparison circuit, which is configured to operably compare a divided voltage of the voltage of the power pin with a divided voltage of the voltage of the shared pin, to determine whether the temperature signal generated by the temperature sensitive device exceeds a temperature threshold.

In one embodiment, the signal determination circuit further includes an offset voltage source, which is configured to operably supply an offset voltage for adjusting the divided voltage of the voltage of the power pin or the divided voltage of the voltage of the shared pin; wherein the temperature threshold is related to the offset voltage.

In one embodiment, the signal determination circuit includes at least one analog-to-digital converter circuit, which is configured to operably convert the divided voltage of the voltage of the power pin and to operably convert the divided voltage of the voltage of the shared pin, to obtain the temperature signal.

In one embodiment, the signal determination circuit further includes a microcontroller unit (MCU), which is configured to operably determine whether the temperature signal generated by the temperature sensitive device exceeds a temperature threshold according to a conversion result of the at least one analog-to-digital converter circuit.

In one embodiment, under the power start-up mode, the first comparison circuit is configured to operably sense the voltage at the bus node via the shared pin, to determine whether to turn ON the path switch to conduct the power path, thereby determining whether or not to enter the power supply mode; or the signal determination circuit further includes a second comparison circuit, which is configured to operably sense the voltage at the bus node via the shared pin under the power start-up mode, to determine whether to turn ON the path switch to conduct the power path, thereby determining whether or not to enter the power supply mode.

In one embodiment, the at least one analog-to-digital converter circuit is configured to operably sense the voltage at the bus node via the shared pin under the power start-up mode, to determine whether to turn ON the path switch to conduct the power path, thereby determining whether or not to enter the power supply mode.

In one embodiment, the protocol control circuit further comprises: a switch control pin coupled to a control terminal of the path switch, and a driver circuit configured to operably control the path switch by controlling a voltage of the switch control pin.

In one embodiment, the protocol control circuit further comprises: a first configuration channel pin and a second configuration channel pin, which are configured to operably receive and transmit configuration of the output power of the power supply circuit; wherein the first configuration channel pin and the second configuration channel pin comply with universal serial bus Type-C (USB Type-C) specification.

In one embodiment, the protocol control circuit further comprises: a feedback control pin, wherein the protocol control circuit controls a level of an output voltage or a level of an output current of the output power of the power converter circuit via the feedback control pin.

In one embodiment, the protocol control circuit further comprises: a current sensing pin and a ground pin, wherein the current sensing pin is configured to operably sense a current flowing through the power path, and wherein the ground pin is configured to operably supply a ground level.

In one embodiment, the protocol control circuit is an integrated circuit (IC) having only and exactly eight pins.

From another perspective, the present invention provides a protocol control circuit for use in a power supply circuit, the power supply circuit comprising: a power converter circuit, which is configured to operably convert an input power to generate an output power at an output node; a path switch coupled between the output node and a bus node, the path switch being configured to operably control a power path between the output node and the bus node; and a temperature sensitive device, which is coupled to the bus node; wherein the protocol control circuit is configured to operably control the power supply circuit and the path switch, the protocol control circuit comprising: a shared pin coupled to the bus node via the temperature sensitive device, the shared pin being configured to operably transmit different signals having different functions under at least two different modes; and a signal determination circuit, which is configured to operably sense a voltage at the bus node via the shared pin under a power start-up mode, to determine whether to turn ON the path switch to conduct the power path, thereby determining whether or not to enter a power supply mode, wherein the path switch is OFF under the power start-up mode; and wherein the signal determination circuit is configured to operably receive a temperature signal generated by the temperature sensitive device via the shared pin under the power supply mode, to determine an ambient temperature.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
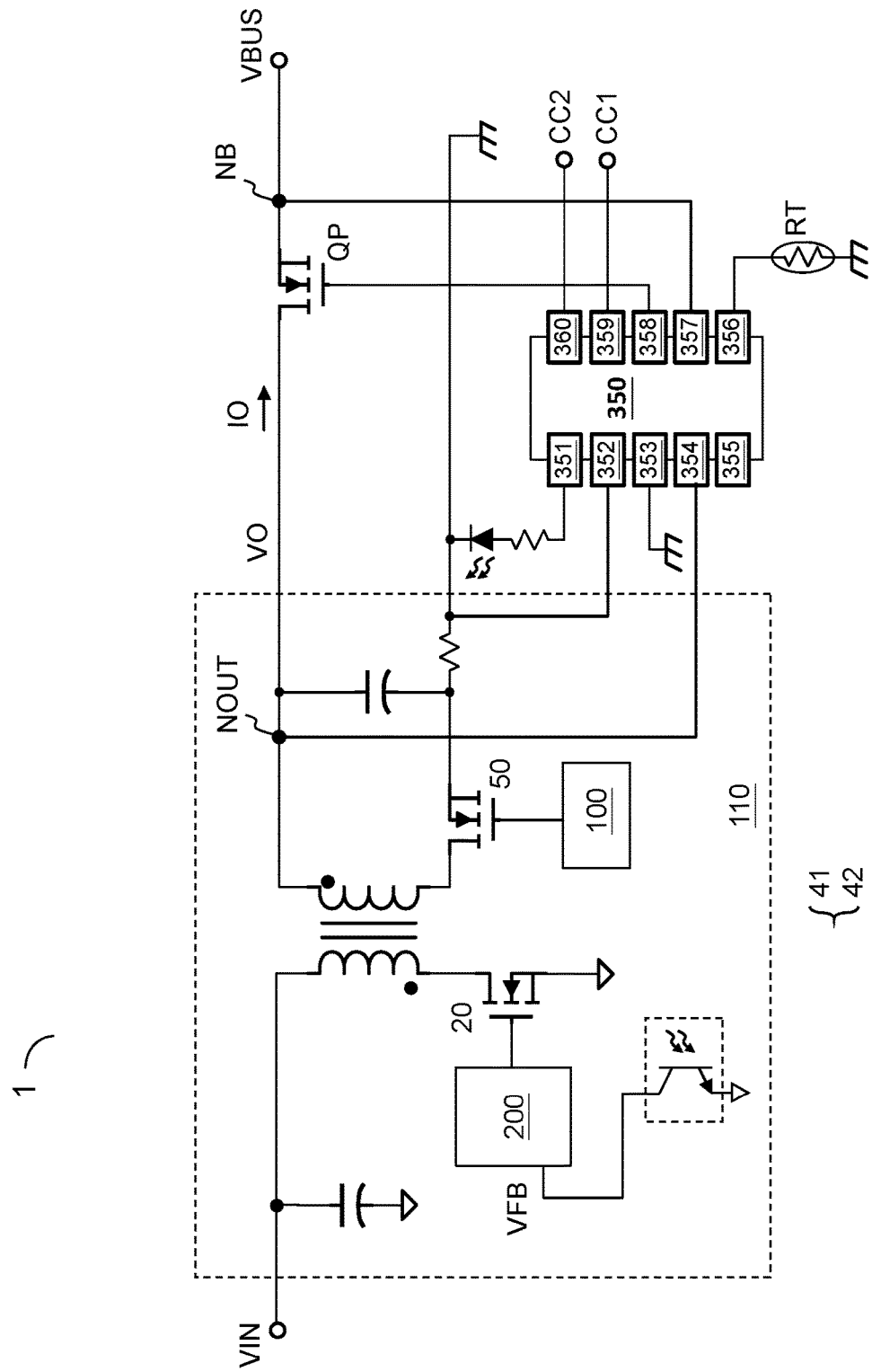
FIG. 1 shows a schematic diagram of a conventional power supply circuit.
Figure 2:
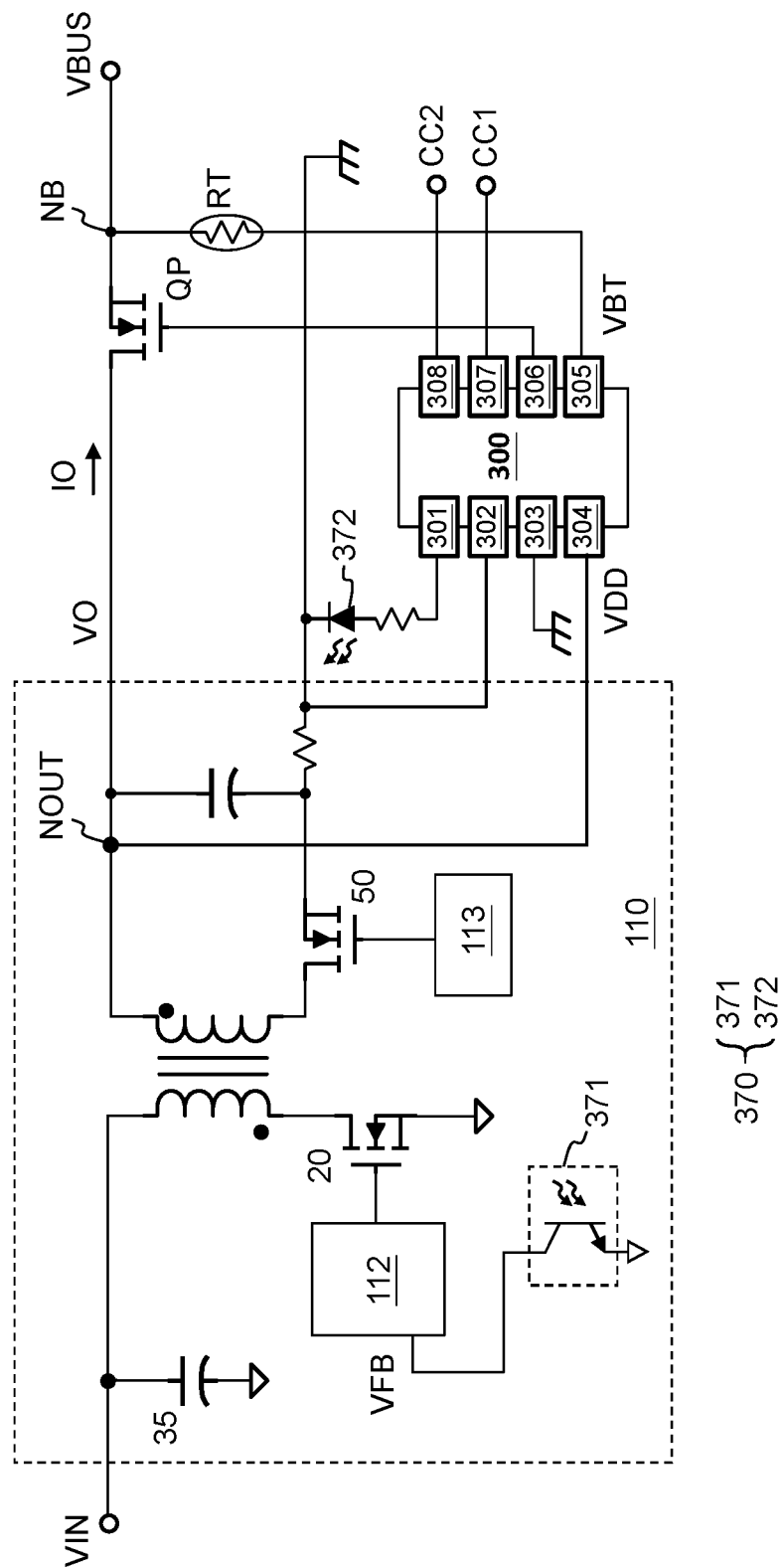
FIG. 2 shows a schematic diagram of a power supply circuit according to an embodiment of the present invention.

Please refer to FIG. 2, which shows a schematic diagram of a power supply circuit (i.e., power supply circuit 2) according to an embodiment of the present invention. The power supply circuit 2 comprises: a power converter circuit 110, a protocol control circuit 300 and a path switch QP. The protocol control circuit 300 is configured to operably control the power converter circuit 110 and the path switch QP. The power converter circuit 110 is configured to operably convert an input power VIN to an output power at an output node NOUT. The path switch QP is coupled between the output node NOUT and a bus node NB, for controlling a power path between the output node NOUT and the bus node NB.

Figure 3:
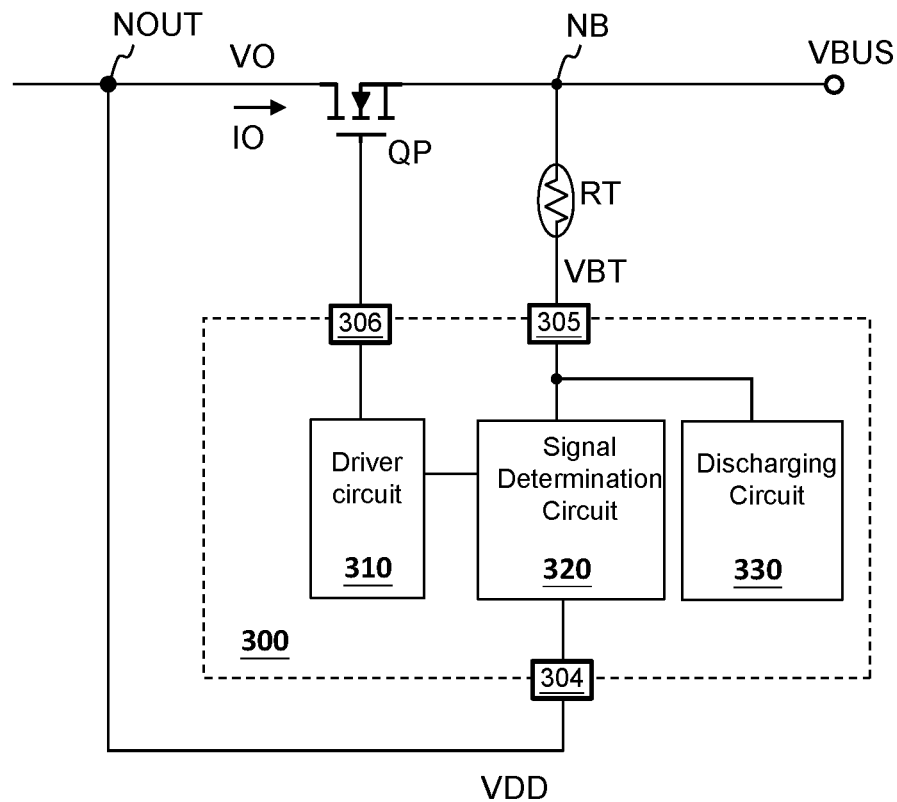
FIG. 3 shows an embodiment of a protocol control circuit of a power supply circuit of the present invention.

Please refer to FIG. 2 in conjugation with FIG. 3. FIG. 3 shows an embodiment of a protocol control circuit (i.e., protocol control circuit 300) of a power supply circuit of the present invention. The protocol control circuit 300 includes a shared pin 305 and a signal determination circuit 320.

The shared pin 305 is coupled to the bus node NB via a thermistor RT. The shared pin 305 is configured to operably transmit different signals having different functions under at least two different modes. The signal determination circuit 320 is configured to operably sense a voltage at the bus node NB via the shared pin 305 under a power start-up mode, to determine whether to control the path switch QP to conduct the power path, thereby determining whether or not to enter a power supply mode. The path switch QP is OFF under the power start-up mode. In addition, the signal determination circuit 320 is configured to operably receive a temperature signal generated by the thermistor RT via the shared pin 305 under a power supply mode, to determine an ambient temperature where the thermistor RT is located. In one embodiment, the thermistor RT can be, for example but not limited to, a negative temperature coefficient (NTC) thermistor or a positive temperature coefficient (PTC) thermistor. In other embodiments, it is also practicable and within the scope of the present invention that the above-mentioned thermistor RT can be replaced by any other type of device having an electrical parameter which is sensitive to a temperature change.

As shown in FIG. 2, in this embodiment, the power converter circuit 110 is a flyback power converter circuit. The flyback power converter circuit includes a primary side control circuit 112 for controlling a primary side switch 20 and a secondary side control circuit 113 for controlling a secondary side switch 50. However, the power converter circuit 110 is not limited to be a flyback power converter circuit. In other embodiment, it is also practicable and within the scope of the present invention that the power converter circuit 110 can be another type of power converter circuit. That is, the power converter circuit 110 can be, for example but not limited to, a buck switching regulator circuit, a boost switching regulator circuit or a buck-boost switching regulator circuit. Or, the power converter circuit 110 can be a low dropout regulator (LDO) circuit.

In one embodiment, the protocol control circuit 300 is an integrated circuit (IC) having pins including at least the above-mentioned shared pin 30. In this embodiment, "via the shared pin", refers to a situation wherein under different modes, different signals (e.g., a voltage at the bus node NB or a temperature signal generated by the thermistor RT) are transmitted from the outside of the protocol control circuit 300 to the inside of the protocol control circuit 300 "via the shared pin 305", and are received or sensed by a corresponding internal circuit (e.g., signal determination circuit 320) of the protocol control circuit 300 is configured to operably sense or receive the different signals. However, in other embodiments, "via a certain pin", can refer to a situation wherein different signals from the outside of the protocol control circuit 300 are transmitted to the inside of the protocol control circuit 300 via this pin or different signals from the inside of the protocol control circuit 300 are transmitted to the outside of the protocol control circuit 300 via this pin.

Please still refer to FIG. 2. In one embodiment, the protocol control circuit 300 further comprises: a first configuration channel pin 307 and a second configuration channel pin 308, which are configured to operably receive and transmit configuration of the output power of the power supply circuit 100. The first configuration channel pin 307 and the second configuration channel pin 308 comply with the universal serial bus Type-C (USB Type-C) specification. In this embodiment, the first configuration channel pin 307 and the second configuration channel pin 308 corresponds to the configuration channel pin CC1 and the configuration channel pin CC2 defined in the USB Type-C specification, respectively.

As one skilled in the art will appreciate, the term "power start-up mode", as may be used herein, is meant to indicate a mode or a time period wherein in an embodiment wherein the power supply circuit 2 complies with the USB Type-C specification, after the protocol control circuit 300 has received configuration of the output power of the power supply circuit 100 via the first configuration channel pin 307 and the second configuration channel pin 308, the protocol control circuit 300 controls the power supply circuit 100 to convert the input power VIN to an output power corresponding to the above-mentioned configuration at an output node NOUT, and during such a mode or time period the path switch QP is OFF. Subsequently, under a "power supply mode", the path switch QP is turned ON to conduct the power path. In other words, under the power supply mode, the path switch QP is ON, so that a voltage VBUS coupled to the bus node NB is equal to the output voltage VO, whereby power can be supplied to a next-stage load circuit coupled to the bus node NB.

The above-mentioned "configuration" of the output power is, for example but not limited to: a level of the output voltage VO and/or a level of the output current IO of the output power, which can be set via the first configuration channel pin 307 and the second configuration channel pin 308.

Figure 4:
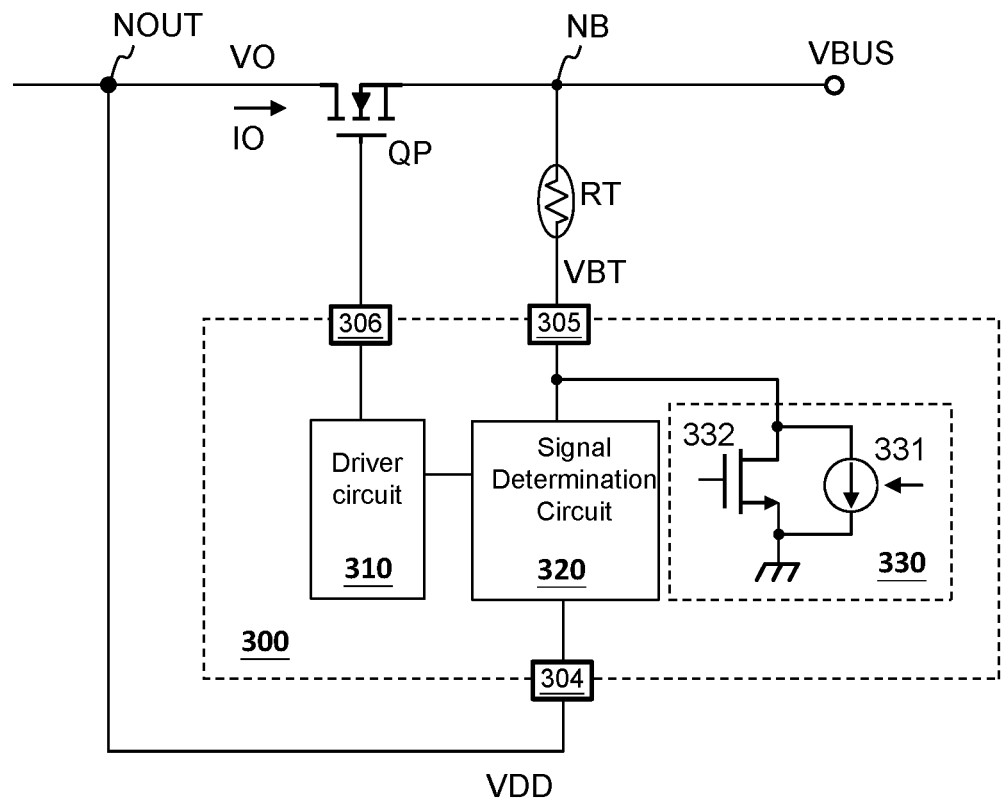
FIG. 4 shows a specific embodiment of a discharging circuit of a protocol control circuit of the present invention.

Please still refer to FIG. 3. In one embodiment, the protocol control circuit 300 further includes a discharging circuit 330 coupled to the bus node NB via the shared pin 305 and the thermistor RT. As shown in FIG. 4, in one embodiment, the discharging circuit 330 includes a discharging current source 331 and/or a discharging switch 332. When the path switch QP is OFF, the discharging current source 331 and/or the discharging switch 332 discharges the voltage VBUS at the bus node NB to a predetermined reference voltage level via the shared pin 305. In one embodiment, the predetermined reference voltage level can be, for example but not limited to, a ground level. In more detail, based upon what is defined in the USB Type-C specification, when the path switch QP is turned OFF due to power off or any other reasons, the residual voltage at the bus node NB needs to be discharged to be lower than a threshold (e.g., to ground level) within a predetermined period. In this embodiment, the discharging circuit 330 can perform the required discharge operation through the shared pin 305 and the thermistor RT.

Please still refer to FIG. 2. In one embodiment, the protocol control circuit 300 further includes a power pin 304 which is coupled to the output node NOUT to receive the output power for supplying power to the protocol control circuit 300. Under the power supply mode, the signal determination circuit 320 obtains the temperature signal according to a voltage difference between a voltage of the power pin 304 and a voltage of the shared pin 305. More specifically, as shown in FIG. 2, under the power supply mode, because the path switch QP is ON, a conduction resistance of the path switch QP, as compared to the resistance of the thermistor RT, can be ignored. That is, the voltage difference between the voltage of the power pin 304 and the voltage of the shared pin 305 is substantially equal to the voltage difference across the thermistor RT. Accordingly, under the power supply mode, the signal determination circuit 320 can obtain the temperature signal according to the voltage difference between the voltage of the power pin 304 and the voltage of the shared pin 305. In one embodiment, the signal determination circuit 320 can directly obtain the temperature signal according to the voltage difference between the voltage of the power pin 304 and the voltage of the shared pin 305. In another embodiment, the signal determination circuit 320 can indirectly obtain the temperature signal according to the voltage difference between the voltage of the power pin 304 and the voltage of the shared pin 305; for example, the signal determination circuit 320 can obtain the temperature signal according to a signal related to the voltage difference (e.g., a divided voltage of the voltage difference). The details as to how the signal determination circuit 320 obtains the temperature signal according to a signal related to the voltage difference will be described later.

Figure 5A:
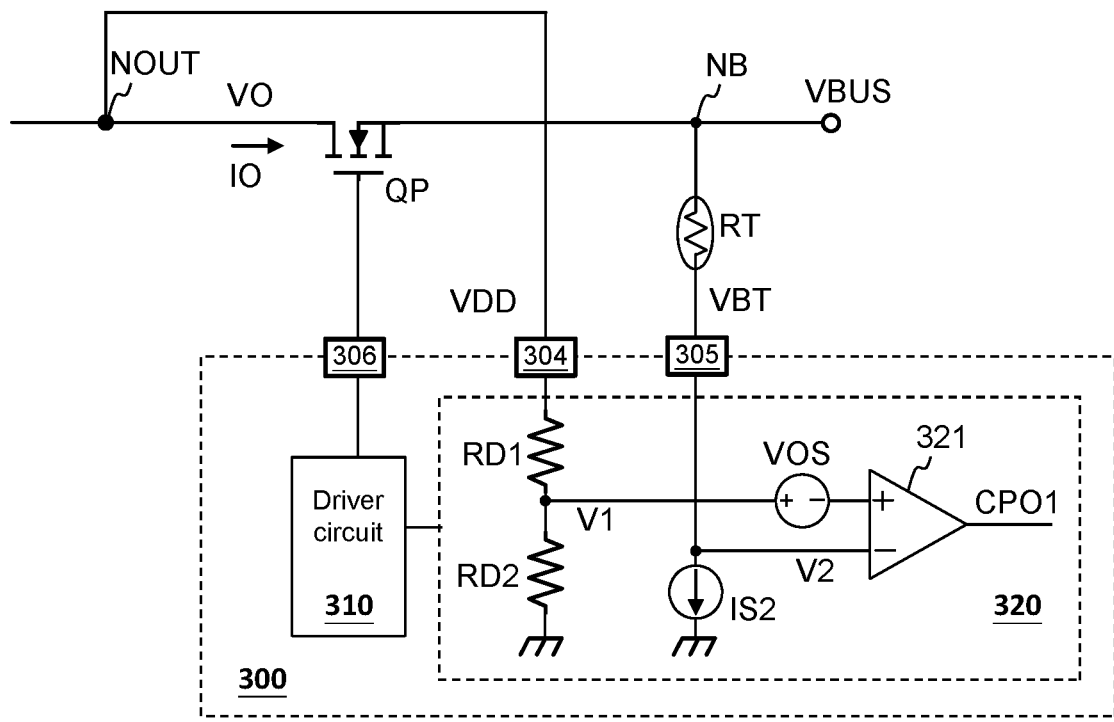
FIG. 5A shows a specific embodiment of a signal determination circuit of a protocol control circuit of the present invention.
Figure 5B:
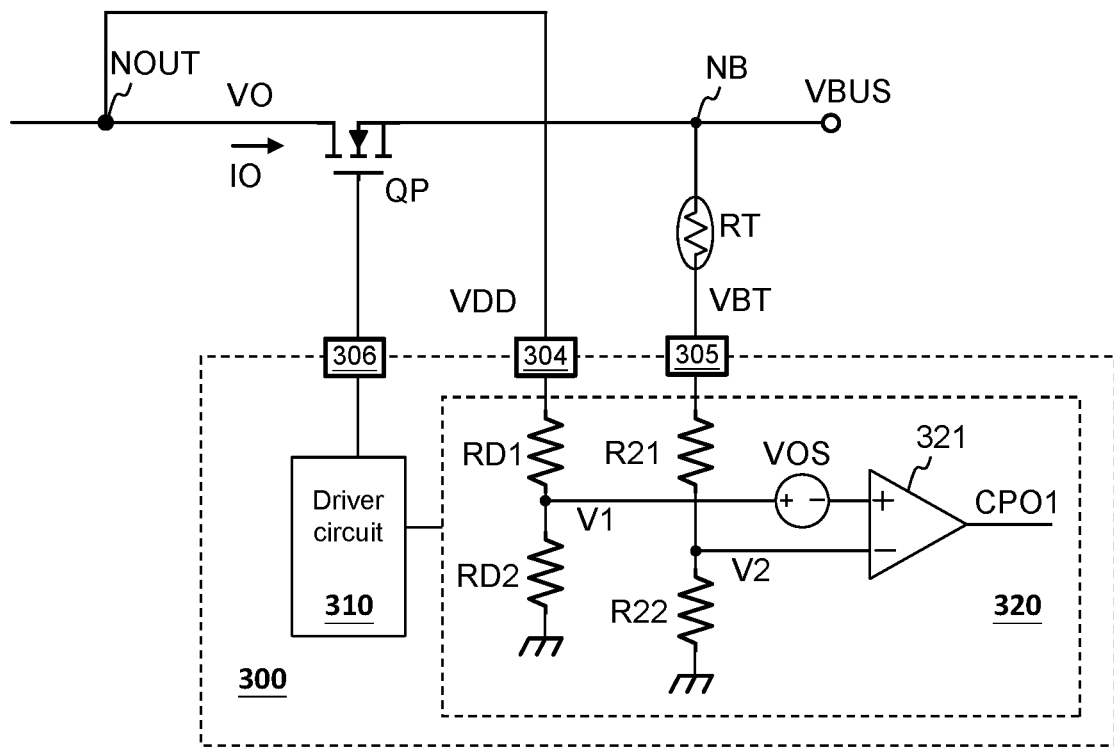
FIG. 5B shows another specific embodiment of a signal determination circuit of a protocol control circuit of the present invention.

Please refer to FIG. 5A and FIG. 5B. FIG. 5A shows a specific embodiment of a signal determination circuit (i.e., signal determination circuit 320) of a protocol control circuit of the present invention. FIG. 5B shows another specific embodiment of a signal determination circuit (i.e., signal determination circuit 320) of a protocol control circuit of the present invention. In one embodiment, the signal determination circuit 320 includes a current source IS2 (as shown in FIG. 5A) or a resistor R2 (as shown in FIG. 5B). The current source IS2 or the resistor R2 is coupled to the thermistor RT via the shared pin 305 and is configured to operably bias the thermistor RT to generate the temperature signal. In more detail, in the embodiment where the signal determination circuit 320 includes a current source IS2, the voltage difference across the thermistor RT is related to the current source IS2, and in the embodiment where the signal determination circuit 320 includes a resistor R2, the voltage difference across the thermistor RT is related to the resistance of the resistor R2. For example, the voltage difference across the thermistor RT is a divided voltage of a resistor circuit including the thermistor RT and the resistor R2. In one embodiment, the current source IS2 and the resistor R2 can both be included in the signal determination circuit 320.

As shown in FIG. 5B, in this embodiment, the resistor R2 includes a resistor R21 and a resistor R22 connected in series. The resistor R21 and the resistor R22 are configured to operably divide a voltage VBT at the shared pin 305, to obtain a signal related to the temperature signal. As shown in FIG. 5A, in this embodiment, a resistor RD1 and a resistor RD2 connected in series are configured to operably obtain a divided voltage of a voltage VDD at the power pin 304.

Please still refer to FIG. 5A and FIG. 5B. In one embodiment, the signal determination circuit 320 includes a comparison circuit 321. The comparison circuit 321 is configured to operably compare a divided voltage (V1) of the voltage VDD of the power pin 304 with a divided voltage (V2) of the voltage VBT of the shared pin 305, to determine whether the temperature signal generated by the thermistor RT exceeds a temperature threshold. In more detail, as shown in FIG. 5A or FIG. 5B, because the thermistor RT is coupled between the shared pin 305 and the bus node NB, under the power supply mode, the voltage VBUS at the bus node NB is substantially equal to the voltage VDD at the power pin 304; thus in this embodiment, by adopting a divided voltage (V1) of the voltage VDD of the power pin 304 as a threshold for comparison, the fluctuation of the voltage VDD can be cancelled.

Note that, in one embodiment, the divided voltage may be obtained by a ratio which is greater than zero, and smaller than or equal to one. the divided voltage ratio for the voltage VDD of the power pin 304 and the divided voltage ratio for the voltage VBT of the shared pin 305 can be determined depending on practical needs.

Please still refer to FIG. 5A and FIG. 5B. In one embodiment, at least one of the input terminals of the comparison circuit 321 can further be coupled with an offset voltage source, which is configured to operably supply an offset voltage VOS, for adjusting the divided voltage of the voltage VDD of the power pin 304 or the divided voltage of the voltage VBT of the shared pin 305. In one embodiment, the temperature threshold is related to the offset voltage VOS.

Note that, in the above-mentioned embodiments shown in FIG. 5A and FIG. 5B, although the comparison circuit 321 does not directly measure the voltage difference across the thermistor RT, by comparing the divided voltage of the voltage VDD of the power pin 304 with the divided voltage of the voltage VBT of the shared pin 305, the temperature signal is still obtained through the voltage difference across the thermistor RT.

When a comparison result CPO1 of the comparison circuit 321 indicates that the temperature signal exceeds a temperature threshold, a protection operation can be performed. In one embodiment, a protection operation can be, for example but not limited to, one or more of the followings: stopping power conversion, turning OFF the path switch QP, and/or issuing an alert to other relevant circuits.

Figure 6A:
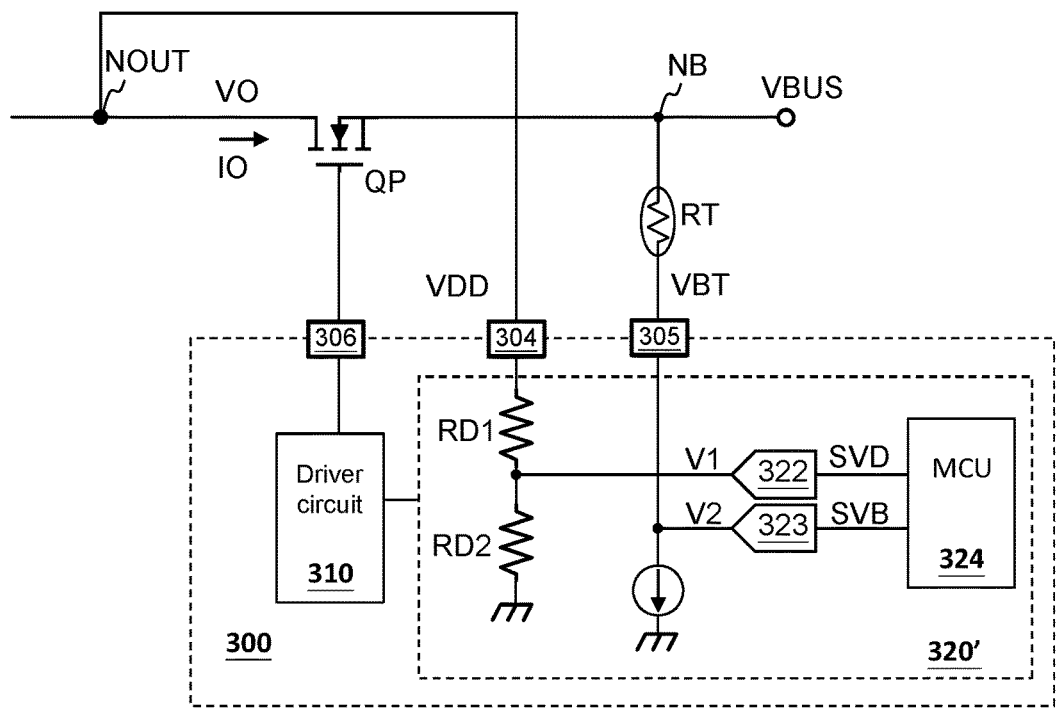
FIG. 6A shows yet another specific embodiment of a signal determination circuit of a protocol control circuit of the present invention.
Figure 6B:
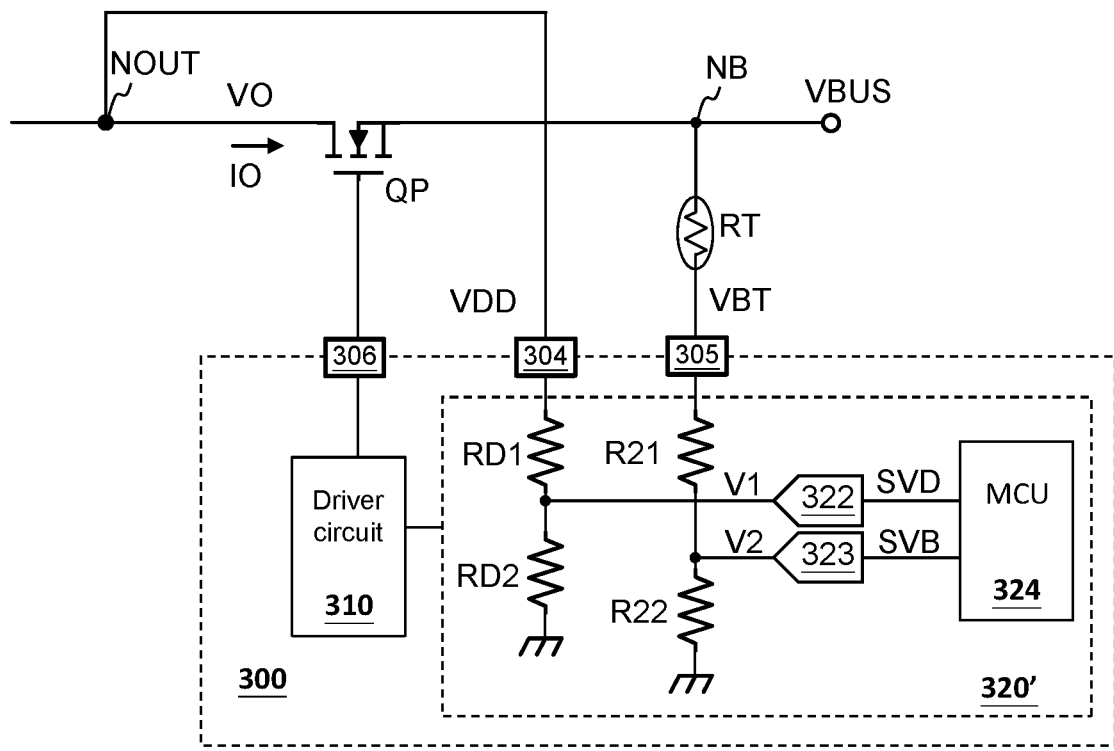
FIG. 6B shows still another specific embodiment of a signal determination circuit of a protocol control circuit of the present invention.

Please refer to FIG. 6A and FIG. 6B. FIG. 6A shows yet another specific embodiment of a signal determination circuit (i.e., signal determination circuit 320') of a protocol control circuit of the present invention. FIG. 6B shows still another specific embodiment of a signal determination circuit (i.e., signal determination circuit 320') of a protocol control circuit of the present invention. In one embodiment, the signal determination circuit 320' includes at least one analog-to-digital converter circuit, which is configured to operably convert the divided voltage of the voltage VDD of the power pin 304 and the divided voltage of the voltage VBT of the shared pin 305, to obtain the temperature signal. As shown in FIG. 6A and FIG. 6B, the signal determination circuit 320' includes analog-to-digital converter circuits 322 and 323. The analog-to-digital converter circuits 322 and 323 are configured to operably convert the divided voltage of the voltage VDD of the power pin 304 and the divided voltage of the voltage VBT of the shared pin 305 to digit signals (i.e., SVD and SVB), respectively. In one embodiment, the signal determination circuit 320' further includes a microcontroller unit (MCU) 324, which is configured to operably receive and process the digit signals SVD and SVB, to determine whether the temperature signal generated by the thermistor RT exceeds a temperature threshold. In another embodiment, the signal determination circuit 320' can adopt one single analog-to-digital converter circuit, to convert the divided voltage of the voltage VDD of the power pin 304 and the divided voltage of the voltage VBT of the shared pin 305 to respective digit signals at different timings in a time-shared manner.

Please still refer to FIG. 5B. In one embodiment, the comparison circuit 321 is configured to operably sense the voltage VBUS at the bus node NB via the shared pin 305, to determine whether to turn ON the path switch QP to conduct the power path, thereby determining whether or not to enter the power supply mode. In more detail, in one embodiment, under the power start-up mode, the comparison circuit 321 can compare the divided voltage of the voltage VBT of the shared pin 305 with a bus voltage threshold, to determine whether to turn ON the path switch QP to conduct the power path. To be more specific, one of the input terminals of the comparison circuit 321 is coupled to the bus voltage threshold under the power start-up mode, and is coupled to the divided voltage of the voltage VDD of the power pin 304 under the power supply mode. The bus voltage threshold and the divided voltage of the voltage VDD can be set the same or differently. If set differently, a multiplexer can be provided to select the bus voltage threshold or the divided voltage of the voltage VDD to be the input of the comparison circuit 321.

Figure 7:
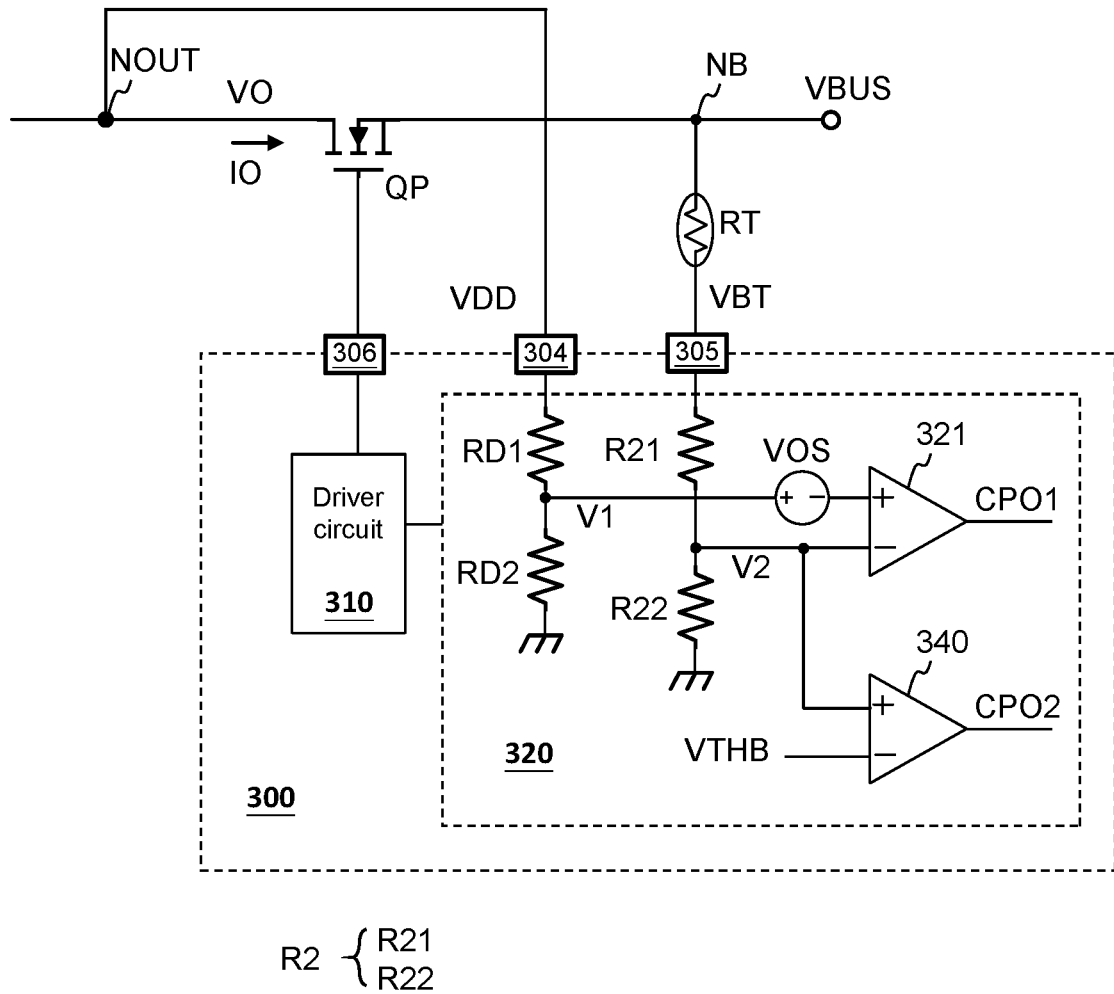
FIG. 7 shows still another specific embodiment of a signal determination circuit of a protocol control circuit of the present invention.

Please refer to FIG. 7, which shows still another specific embodiment of a signal determination circuit (i.e., signal determination circuit 320) of a protocol control circuit of the present invention. In one embodiment, the signal determination circuit 320 further includes another comparison circuit 340, which is configured to operably sense the voltage VBUS at the bus node NB via the shared pin 305 under the power start-up mode, to determine whether to turn ON the path switch QP to conduct the power path, thereby determining whether or not to enter the power supply mode. In more detail, in this embodiment, the comparison circuit 340 is configured to operably compare the divided voltage (which is related to the voltage VBUS at the bus node NB) of the voltage VBT of the shared pin 305 with a bus voltage threshold VTHB, to determine whether to turn ON the path switch QP to conduct the power path, thereby determining whether or not to enter the power supply mode.

Please still refer to FIG. 6A and FIG. 6B. In one embodiment, under the power start-up mode, the analog-to-digital converter circuit 322 senses the voltage VBUS at the bus node NB via the shared pin 305, to determine whether to turn ON the path switch QP to conduct the power path, thereby determining whether or not to enter the power supply mode. To be more specific, the analog-to-digital converter circuit 322 receives and converts the divided voltage of the voltage VBT of the shared pin 305 (which is related to the voltage VBUS at the bus node NB) to a digit signal. Subsequently, the microcontroller unit (MCU) 324 can determine whether to turn ON the path switch QP according to the converted digit signal.

Please refer to FIG. 2 in conjugation with FIG. 7. In one embodiment, the protocol control circuit 300 further comprises: a switch control pin 306 and a driver circuit 310. The driver circuit 310 is coupled to a control terminal of the path switch QP via the switch control pin 306. The driver circuit 310 controls a voltage of the switch control pin 306 according to a determination result from the signal determination circuit 320, to thereby control the path switch QP. In one embodiment, the protocol control circuit 300 further comprises a feedback control pin 301. The protocol control circuit 300 controls a level of an output voltage or a level of an output current of the output power of the power converter circuit 110 via the feedback control pin 301. In this embodiment, the protocol control circuit 300 is coupled to a photocoupler 370 via the feedback control pin 301, to feedback control the power converter circuit 110 in a non-contact isolated manner. In other embodiments, it is also practicable and within the scope of the present invention that the power converter circuit 110 is feedback controlled in a contact non-isolated manner. The way of feedback control should be adaptively arranged according to how the power converter circuit 110 is implemented, which is known by one skilled in this art and therefore is not redundantly explained here.

Please still refer to FIG. 2. In one embodiment, the protocol control circuit 300 further comprises: a current sensing pin 302 and a ground pin 303. The current sensing pin 302 is configured to operably sense a current flowing through the power path. The ground pin 303 is configured to operably supply a ground level.

In one embodiment, the protocol control circuit 300 comprises only and exactly eight pins (i.e., the above-mentioned eight pins 301-308).

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply circuit, comprising:
   a power converter circuit, which is configured to operably convert an input power to generate an output power at an output node;
   a path switch coupled between the output node and a bus node, the path switch being configured to operably control a power path between the output node and the bus node;
   a temperature sensitive device, which is coupled to the bus node; and
   a protocol control circuit, which is configured to operably control the power converter circuit and the path switch, wherein the protocol control circuit includes:
      a shared pin coupled to the bus node via the temperature sensitive device, the shared pin being configured to operably transmit different signals having different functions under at least two different modes; and
      a signal determination circuit, which is configured to operably sense a voltage at the bus node via the shared pin under a power start-up mode, to determine whether to control the path switch to conduct the power path, thereby determining whether or not to enter a power supply mode, wherein the path switch is OFF under the power start-up mode; and wherein the signal determination circuit is configured to operably receive a temperature signal generated by the temperature sensitive device via the shared pin under the power supply mode, to determine an ambient temperature.

2. The power supply circuit of claim 1, wherein the protocol control circuit further includes a discharging circuit coupled to the bus node via the shared pin and the temperature sensitive device, wherein the discharging circuit includes a discharging current source and/or a discharging switch; wherein when the path switch is turned OFF, the discharging current source and/or the discharging switch, via the shared pin, discharges the voltage at the bus node to a predetermined reference voltage level.

3. The power supply circuit of claim 1, wherein the protocol control circuit further includes a power pin coupled to the output node, to receive the output power and to supply power to the protocol control circuit; wherein under the power supply mode, the signal determination circuit obtains the temperature signal according to a voltage difference between a voltage of the power pin and a voltage of the shared pin.

4. The power supply circuit of claim 1, wherein the signal determination circuit includes a first current source or a first resistor, wherein the first current source or the first resistor is coupled to the temperature sensitive device via the shared pin and is configured to operably bias the temperature sensitive device to generate the temperature signal.

5. The power supply circuit of claim 3, wherein the signal determination circuit includes a first comparison circuit, which is configured to operably compare a divided voltage of the voltage of the power pin with a divided voltage of the voltage of the shared pin, to determine whether the temperature signal generated by the temperature sensitive device exceeds a temperature threshold.

6. The power supply circuit of claim 5, wherein the signal determination circuit further includes an offset voltage source, which is configured to operably supply an offset voltage for adjusting the divided voltage of the voltage of the power pin or for adjusting the divided voltage of the voltage of the shared pin; wherein the temperature threshold is related to the offset voltage.

7. The power supply circuit of claim 3, wherein the signal determination circuit includes at least one analog-to-digital converter circuit, which is configured to operably convert the divided voltage of the voltage of the power pin and to operably convert the divided voltage of the voltage of the shared pin, to obtain the temperature signal.

8. The power supply circuit of claim 7, wherein the signal determination circuit further includes a microcontroller unit (MCU), which is configured to operably determine whether the temperature signal generated by the temperature sensitive device exceeds a temperature threshold according to a conversion result of the at least one analog-to-digital converter circuit.

9. The power supply circuit of claim 5, wherein:
under the power start-up mode, the first comparison circuit is configured to operably sense the voltage at the bus node via the shared pin, to determine whether to turn ON the path switch to conduct the power path, thereby determining whether or not to enter the power supply mode; or
the signal determination circuit further includes a second comparison circuit, which is configured to operably sense the voltage at the bus node via the shared pin under the power start-up mode, to determine whether to turn ON the path switch to conduct the power path, thereby determining whether or not to enter the power supply mode.

10. The power supply circuit of claim 7, wherein the at least one analog-to-digital converter circuit is configured to operably sense the voltage at the bus node via the shared pin under the power start-up mode, to determine whether to turn ON the path switch to conduct the power path, thereby determining whether or not to enter the power supply mode.

11. A protocol control circuit for use in a power supply circuit, the power supply circuit comprising: a power converter circuit, which is configured to operably convert an input power to generate an output power at an output node; a path switch coupled between the output node and a bus node, the path switch being configured to operably control a power path between the output node and the bus node; and a temperature sensitive device, which is coupled to the bus node; wherein the protocol control circuit is configured to operably control the power supply circuit and the path switch, the protocol control circuit comprising:

a shared pin coupled to the bus node via the temperature sensitive device, the shared pin being configured to operably transmit different signals having different functions under at least two different modes; and a signal determination circuit, which is configured to operably sense a voltage at the bus node via the shared pin under a power start-up mode, to determine whether to turn ON the path switch to conduct the power path, thereby determining whether or not to enter a power supply mode, wherein the path switch is OFF under the power start-up mode; and wherein the signal determination circuit is configured to operably receive a temperature signal generated by the temperature sensitive device via the shared pin under the power supply mode, to determine an ambient temperature.

12. The protocol control circuit of claim 11, further comprising:
a discharging circuit coupled to the bus node via the shared pin and the temperature sensitive device, wherein the discharging circuit includes a discharging current source and/or a discharging switch; wherein when the path switch is turned OFF, the discharging current source and/or the discharging switch, via the shared pin, discharges the voltage at the bus node to a predetermined reference voltage level.

13. The protocol control circuit of claim 11, further comprising:
a power pin coupled to the output node, to receive the output power and to supply power to the protocol control circuit; wherein under the power supply mode, the signal determination circuit obtains the temperature signal according to a voltage difference between a voltage of the power pin and a voltage of the shared pin.

14. The protocol control circuit of claim 11, wherein the signal determination circuit includes a first current source or a first resistor, wherein the first current source or the first resistor is coupled to the temperature sensitive device via the shared pin and is configured to operably bias the temperature sensitive device to generate the temperature signal.

15. The protocol control circuit of claim 13, wherein the signal determination circuit includes a first comparison circuit, which is configured to operably compare a divided voltage of the voltage of the power pin with a divided voltage of the voltage of the shared pin, to determine whether the temperature signal generated by the temperature sensitive device exceeds a temperature threshold.

16. The protocol control circuit of claim 15, wherein the signal determination circuit further includes an offset voltage source, which is configured to operably supply an offset voltage, for adjusting the divided voltage of the voltage of the power pin or for adjusting the divided voltage of the voltage of the shared pin; wherein the temperature threshold is related to the offset voltage.

17. The protocol control circuit of claim 13, wherein the signal determination circuit includes at least one analog-to-digital converter circuit, which is configured to operably convert the divided voltage of the voltage of the power pin and to operably convert the divided voltage of the voltage of the shared pin, to obtain the temperature signal.

18. The protocol control circuit of claim 17, wherein the signal determination circuit further includes a microcontroller unit (MCU), which is configured to operably determine whether the temperature signal generated by the temperature sensitive device exceeds a temperature threshold according to a conversion result of the at least one analog-to-digital converter circuit.

19. The protocol control circuit of claim 15, wherein:
under the power start-up mode, the first comparison circuit is configured to operably sense the voltage at the bus node via the shared pin, to determine whether to turn ON the path switch to conduct the power path, thereby determining whether or not to enter the power supply mode; or the signal determination circuit further includes a second comparison circuit, which is configured to operably sense the voltage at the bus node via the shared pin under the power start-up mode, to determine whether to turn ON the path switch to conduct the power path, thereby determining whether or not to enter the power supply mode.

20. The protocol control circuit of claim 17, wherein the at least one analog-to-digital converter circuit is configured to operably sense the voltage at the bus node via the shared pin under the power start-up mode, to determine whether to control the path switch to conduct the power path, thereby determining whether or not to enter the power supply mode.

21. The protocol control circuit of claim 13, further comprising:
a switch control pin coupled to a control end of the path switch; and
a driver circuit configured to operably control the path switch by controlling a voltage of the switch control pin.

22. The protocol control circuit of claim 21, further comprising:
a first configuration channel pin and a second configuration channel pin, which are configured to operably receive and transmit configuration of the output power of the power supply circuit; wherein the first configuration channel pin and the second configuration channel pin comply with universal serial bus Type-C (USB Type-C) specification.

23. The protocol control circuit of claim 22, further comprising:
a feedback control pin, wherein the protocol control circuit controls a level of an output voltage or a level of an output current of the output power of the power converter circuit via the feedback control pin.

24. The protocol control circuit of claim 23, further comprising:
a current sensing pin and a ground pin, wherein the current sensing pin is configured to operably sense a current flowing through the power path, and wherein the ground pin is configured to operably supply a ground level.

25. The protocol control circuit of claim 24, wherein the protocol control circuit is an integrated circuit (IC) having only and exactly eight pins.

* * * * *